United States Patent [19]

Moreno et al.

[11] 4,380,521
[45] Apr. 19, 1983

[54] METHOD TO PRODUCE A POLYTETRA-FLUOROETHYLENE DIAPHRAGM

[75] Inventors: Carlos M. Moreno; Robert D. Bridges; Andre J. Uzee, all of Baton Rouge, La.

[73] Assignee: The Dow Chemical Company, Midland, Mich.

[21] Appl. No.: 189,977

[22] Filed: Sep. 22, 1980

Related U.S. Application Data

[63] Continuation-in-part of Ser. No. 877,060, Feb. 13, 1978, Pat. No. 4,224,130, which is a continuation of Ser. No. 777,868, Mar. 15, 1977, abandoned.

[51] Int. Cl.$^3$ ............................................. B29D 27/00
[52] U.S. Cl. ....................................... 264/49; 204/266; 264/127
[58] Field of Search .................... 264/49, 127, 41; 204/266

[56] References Cited

U.S. PATENT DOCUMENTS

| | | | |
|---|---|---|---|
| 3,281,511 | 10/1966 | Goldsmith | 264/49 |
| 3,407,249 | 10/1968 | Landi | 264/49 |
| 3,556,161 | 1/1971 | Roberts | 264/49 X |
| 3,661,645 | 5/1972 | Strier et al. | 264/49 X |
| 3,859,402 | 1/1975 | Bintliff et al. | 264/49 |
| 3,890,417 | 6/1975 | Vallance | 264/49 |
| 4,170,540 | 10/1979 | Lazarz et al. | 264/127 X |
| 4,196,070 | 4/1980 | Chao et al. | 264/49 X |
| 4,224,130 | 9/1980 | Moreno et al. | 204/266 |
| 4,289,600 | 9/1981 | Lazarz et al. | 264/49 X |

FOREIGN PATENT DOCUMENTS 725704 1/1966 Canada .
1081046 8/1967 United Kingdom .

*Primary Examiner*—Philip E. Anderson
*Attorney, Agent, or Firm*—Robert W. Selby

[57] ABSTRACT

The method of the present invention produces a porous, electrolyte permeable polytetrafluoroethylene diaphragm with a thickness of about 5 to about 100 mils and an average pore size of about 0.1 to about 100 microns. This diaphragm is suitable for use in an electrolytic diaphragm cell adapted to electrolytically form chlorine and an alkali metal hydroxide from an aqueous alkali chloride solution.

15 Claims, No Drawings

METHOD TO PRODUCE A POLYTETRA-FLUOROETHYLENE DIAPHRAGM

REFERENCE TO PRIOR APPLICATION

This application is a continuation-in-part of patent application Ser. No. 877,060, filed Feb. 13, 1978, now U.S. Pat. No. 4,224,130, which was a continuation of application Ser. No. 777,868, filed Mar. 15, 1977, now abandoned.

BACKGROUND OF THE INVENTION

This invention pertains to the production of a porous diaphragm for use in an electrolytic cell and more in particular to a method to form a porous, organic diaphragm.

Gaseous chlorine has long been produced from sodium chloride in an electrolytic cell having an anode positioned within an anode compartment and a cathode in a cathode compartment spaced apart from the anode compartment by an ion and liquid permeable diaphragm, such as one at least partially formed of asbestos. Other electrolytic cells employ an ion permeable and liquid impermeable ion exchange membrane to separate the anode and cathode chambers. In such electrolytic cells, products including chlorine and sodium hydroxide are formed in the anode and cathode compartments, respectively.

Porous polymeric materials have gained interest over the past few years for use in numerous areas. For example, Canadian Pat. No. 725,704 pertains to a method to calendar mixtures (including polytetrafluoroethylene resins, a liquid capable of wetting the resin and a solid particulate) into porous sheet suitable as filters, separators for batteries and fuel cells, supports for electrode materials, and the like. In the process of British Pat. No. 1,081,046, an aqueous dispersion of polytetrafluoroethylene and a 5 to 30 micron solid particulate additive are formed into a sheet whereafter the particulate additive is leached from the sheet to produce a diaphragm for an electrolytic cell. The sheet of the British Patent can include an inorganic filler, such as barium sulfate, titanium dioxide, amphibol asbestos or serpentine asbestos. Other patents also describe various methods to make and/or use liquid permeable polymeric diaphragms; see for example, U.S. Pat. Nos. 3,627,859; 3,944,477; 4,089,758; 4,098,672 and 4,170,540.

For brevity, polytetrafluoroethylene will hereinafter be referred to as "PTFE".

Electrolytic cells using an alkali metal ion and electrolyte permeable PTFE diaphragm to produce chlorine and an alkali metal hydroxide are substantially the same as prior cells with asbestos diaphragms. For example, the PTFE electrolytic cell includes an anode compartment suited to contain an anolyte such as an aqueous solution or mixture of an alkali metal chloride, for example, sodium chloride, and a cathode compartment adapted to contain a catholyte containing the hydroxide of the alkali metal spaced apart from the anode compartment by the permeable PTFE diaphragm.

Anodes and cathodes are suitably positioned within the respective anode and cathode compartments with a means to supply a direct current to the anode and the cathode suitably electrically connected to these electrodes. The electrolytic cell further includes a means to remove the chlorine produced at the anode from the anode compartment and means to remove the alkali metal hydroxide, and hydrogen if formed, from the cathode compartment.

The PTFE diaphragm separating the anode and cathode compartments is suited to pass a portion of the electrolyte and ions of at least the alkaline metal from the anode compartment to the cathode compartment. This diaphragm is suitably positioned in the electrolytic cell to substantially entirely separate the anode compartment from the cathode compartment.

The diaphragms of the prior art are generally satisfactory; however, there is still a need for a method to produce an improved electrolyte permeable PTFE diaphragm suitable for use in electrolytic cells.

SUMMARY OF THE INVENTION

The method of the present invention produces an electrolyte permeable porous PTFE sheet with a thickness of from about 5 to about 100 mils (1 mil equals 1/1000 inch), an average pore size of from about 0.1 to about 100 microns, longitudinal and transverse tensile strengths of from about 100 to about 1000 pounds per square inch (psi), a gas permeability of from about 1 to about 100 seconds, and a liquid permeability factor of from about 1 to about 60. The "liquid permeability factor" is herein defined as the water head in inches above the diaphragm portion measured required to cause an average of 1 cubic centimeter of water (at 30° C. and standard atmospheric pressure) to pass through a one square centimeter portion of the wetted diaphragm in one hour. The gas permeability is determined substantially in accord with ASTM Standard D-726-58 (Reapproved 1965), method B, save for the air pressure which is 4 ounces. Said ASTM Standard is incorporated herein by reference.

The method to produce such sheet involves:
(a) combining about 1 to about 50 parts by weight PTFE powder having an average particle size of about 100 to about 1,000 microns diameter with about 50 to about 98 parts by weight of a solid pore-forming powder having an average particle size of about 0.1 to about 100 microns diameter, and about 10 to about 1,000 parts by weight of a nonaqueous liquid capable of wetting the PTFE and incapable of dissolving substantial amounts of the pore-forming powder;
(b) mixing the combination with a shearing means sufficiently to reduce the average particle sizes of the PTFE to less than about 50 microns diameter;
(c) removing liquid from the mixture of step (b) until the mixture has a liquid to solid weight ratio of about 0.05 to about 1;
(d) rolling the compressed mixture a plurality of times to form a sheet;
(e) heating the sheet sufficiently to sinter the sheet material; and
(f) removing at least a portion of the solid pore-forming powder from the sintered sheet by contacting the sheet with a liquid medium to produce the porous PTFE sheet.

DESCRIPTION OF THE PREFERRED EMBODIMENTS

In one embodiment of the present invention, PTFE powder and a solid pore-forming powder are fabricated into an electrolyte wettable and permeable sheet suitable for use as a diaphragm in an electrolytic cell for producing an alkali metal hydroxide and a gaseous halogen. The diaphragm has proven to be useful in cells for producing gaseous chlorine and an aqueous sodium hydroxide solution.

The Teflon particles are mixed with a fine solid pore-forming powder having a preferred average particle size of about 1 to about 10 (and more preferably about 8 to about 10) microns diameter and about 100 to about 400 (and more preferably about 200 to about 250) parts by weight of a nonaqueous liquid capable of wetting the PTFE and simultaneously incapable of dissolving substantial amounts of the pore-forming powder. The pore-forming powder is preferably sodium chloride, but other materials such as sodium borate, sodium carbonate, calcium carbonate, starch, metal oxides, and the like are suitable. Nonaqueous liquids including oils, aliphatic hydrocarbons, for example, kerosene, are operable, however, Stoddard solvent and Varsol solvent have been determined to produce a satisfactory PTFE sheet.

For convenience, without limiting the scope of the invention, the hereinafter description will be made with reference to the preferred sodium chloride powder and Stoddard solvent. It is to be understood, however, that other materials are within the scope of the present invention.

The PTFE and sodium chloride powders are combined in a PTFE to sodium chloride weight ratio of about 1:2 to about 1:9 and preferably about 1:4 to about 1:5.6. Optionally, a water wettable filler powder can be combined, or mixed with the powdered PTFE and sodium chloride. Fillers such as silicon dioxide, titanium dioxide and carbon may be added in amounts of about 5 to about 500 percent by weight of the PTFE present. The filler powder has an average particle size of less than about 100, and preferably from about 0.005 to about 0.03 micron.

The PTFE, sodium chloride and optional filler material are combined with the Stoddard solvent and mixed, or blended, together by a means capable of reducing the diameter of the PTFE to an average of about 0.1 to about 20, and preferably about 1 to about 5, microns diameter. Although the PTFE and sodium chloride can be mixed together prior to adding the Stoddard solvent, these materials are generally, and preferably, combined and mixed together simultaneously. When a solid filler is utilized in addition to the sodium chloride, the dry sodium chloride and filler are advantageously premixed before addition of the nonaqueous liquid. This will result in a porous PTFE diaphragm with greater water wettability than if such premixing is not employed. As will be apparent to one skilled in the art, blending with, for example, a sigma blade mixer or a common rotary blade blender of the type used in many homes, for example, a Waring brand blender, will provide the mixing and shear-type action desired to reduce the size and elongate the PTFE particles.

Following mixing, a major portion of the Stoddard solvent is removed from the slurry which is formed during mixing. Removal of the liquid is conveniently carried out by use of a standard vacuum-type filter. Use of a filter is desired because the solid residue remaining on the filter media can be used directly in the following preferred step wherein the solids are compressed at a pressure of about 10 to about 100 pounds per square inch (psi). Naturally, other means of removing liquid from the slurry are also acceptable; for example, use of a centrifuge, evaporation, and the like. To minimize settling of the solids from the slurry and to produce a filter cake of more uniform composition, it is preferred that filtering be carried out shortly after the mixing has been completed.

To remove additional Stoddard solvent and to produce a solid body more suitable for subsequent rolling, the filter cake is optionally compressed at a pressure of about 10 to about 100 and preferably about 40 to about 80 and more preferably at about 60 psi. Although not critical, a more uniform compressed material is produced when the pressure is initially applied at a rate of about 1 to about 10 (preferably about 4 to about 7) pounds per square inch per minute until the desired maximum pressure is reached. The desired maximum pressure is maintained for a sufficient time to permit a major portion of the remaining Stoddard solvent to be removed from the compressed material and to obtain a body of a substantially uniform composition. Generally, a time of from about 5 to about 15 minutes is adequate.

Rolling of the compressed material, which is now in a sheet-like configuration, is performed using a bank of rolls suitable for calendering PTFE. Before calendering, the compressed PTFE is heated to about 65 to about 150° F. and preferably to about 110° F. For optimum results, the rolls are maintained at a temperature of from about 75 to about 150° F.

The compressed PTFE sheet is passed between the rolls a plurality of times. Between at least a portion of such passes, the rolled PTFE sheet is folded in half along its longitudinal axis and then rotated so that the folded sheet passes through the rolls in a direction roughly 90° to the immediately prior rolling pass.

After calendering has been completed, the calendered sheet may be, if desired, formed into a shape for use in a chlorine-caustic electrolytic cell. For example, the porous PTFE mat or sheet can be sealably formed into a pocket-like structure and positioned around what is known in the art as a "pocket cathode" to replace an asbestos diaphragm as described in, for example, U.S. Pat. No. 2,858,263. The PTFE sheet can, if desired, be positioned to space apart the anode and cathode of a cell as in, for example, U.S. Pat. No. 3,923,628.

After calendering, the sheet is heated to remove volatile materials and to sinter the PTFE. This is carried out at a temperature of at least about 325° C. to less than the decomposition temperature of the PTFE, and preferably about 340 to about 380° C. It has been found that about ¼ to about 2 (preferably about 0.5 to about 1.5) hours at about 360° C. is adequate to accomplish the desired sintering. The particular time at which the sheet remains at the elevated temperature is not critical so long as the material is sintered.

Subsequent to sintering, at least a portion of the pore-forming particulate is removed therefrom to produce a porous PTFE sheet. Water soluble materials, such as sodium borate, sodium chloride and sodium carbonate, are conveniently removed by leaching with water. Addition of a surfactant such as Zonyl ® FSN, Zonyl FSC and Triton ® X-100 or X-114 fluoro surfactants may optionally be added to the water to hasten dissolution of the pore-forming material and to coat the surface of the PTFE with the surfactant to produce a PTFE surface with greater water wettability. The surfactant is added to the water in minor amounts, for example, about 0.01 to about 0.5 weight percent has been found to be satisfactory. Other liquid leachants, such as a dilute aqueous solution of sodium hydroxide may be used to remove the solid pore-forming powder from the sintered PTFE sheet providing that the liquid used does not detrimentally react with the PTFE.

Generally, leaching is carried out after the sintered sheet is cooled from the sintering temperature to about room temperature. As will be apparent to one skilled in the art, such leaching to remove the pore-forming particulate can be done at elevated temperatures and pressures without altering the basic invention. The porous PTFE sheet is usually dried after leaching. Preferably, such drying is carried out at a temperature of up to about 85° F. Although the time required for drying may vary considerably, it has been found that about 24 to about 30 hours is adequate. If desired, the leaching can be carried out after installation of the diaphragm in an electrolytic cell. When the diaphragm is leached in situ, the subsequent drying step will usually be omitted. Frequently, however, such in situ leaching may be undesirable because unleached diaphragms may lack sufficient flexibility to permit easy installation into the cell.

To achieve more consistent electrolytic cell operation, the porous PTFE sheet used as a diaphragm is preferably about 40 to about 80 mils thick with an average pore size of from about 1 to about 20 (and more preferably about 3 to about 10) microns. The pores are preferably substantially uniformly distributed throughout the diaphragm and interconnectingly extend through the sheet to provide a gas permeability of from about 1 to about 100 and more preferably about 60 to about 90 seconds. Furthermore, the size of the pores throughout the diaphragm are such that about 80 to about 100 percent, and preferably about 85 to about 95 percent, of the pores are of a size within two orders of magnitude from each other; for example, when the average pore size is 1 micron, about 80 to 100 percent of the pores are within the size range of 0.1 to 10 microns.

The PTFE sheet used as a diaphragm is from about 60 to about 90, and preferably from about 70 to about 80, percent porous. In addition to the hereinbefore delineated parameters, the porous PTFE diaphragm must pass sufficient electrolyte from the anode compartment to the cathode compartment of an electrolytic cell to maintain catholyte within the cathode compartment during operation of the cell. A liquid permeability factor of about 1 to about 60, and preferably about 5 to about 25, has been determined to be satisfactory.

The PTFE sheet should have sufficient strength to retain the desired structure, i.e., permeability, pore size, thickness and shape, when in use for extended time periods in the corrosive environment and temperatures present in an operating electrolytic cell. PTFE sheet with tensile strength of about 150 to about 700 pounds per square inch (psi), and more preferably about 250 to about 600 psi is satisfactory.

An electrolytic cell employing the porous PTFE sheet of the present invention as a diaphragm operates in substantially the same manner as does a well-known cell with an asbestos diaphragm. A brine containing a dissolved salt, such as sodium chloride, is fed into the anode compartment wherein it flows through the porous PTFE diaphragm into the cathode compartment. Sufficient electrical energy is applied to the anode and cathode to release gaseous chlorine at the anode and to form the alkali metal hydroxide in the cathode compartment. The gaseous chlorine, alkali metal hydroxide and gaseous hydrogen, if present, are suitably removed and recovered from the cell by means known to those skilled in the art.

The following example further exemplifies the method of the present invention.

975.8 Grams of sodium chloride with a particle size of about 3 to 10 microns in diameter was mixed with 214 grams dry PTFE powder having an average particle size of about 500 microns (purchased from DuPont as Teflon No. 6 resin powder) in a Waring brand blender with three quarts (at about 70° to about 90° F.) Varsol solvent for 10 minutes at high speed. The average diameter of the Teflon resin after blending was 4 microns.

The slurry from the blender was filtered through a vacuum filter within 1 minute after blending o prevent settling of a substantial quantity of the solid portion of the slurry. Filtering was carried out using a Whatman No. 1 chromatographic filter paper and a vacuum set at about 15 inches of mercury. Filtering for 5 minutes at the 15 inches of mercury vacuum removed about 70 percent of the Varsol solvent from the slurry. When the vacuum pressure fell below 15 inches of mercury, filtering was continued for an additional 5 minutes.

Pressure was then applied to the filter cake at a rate of about 4 to 5 pounds per minute until the 60 pounds pressure was attained. The 60 pound pressure was maintained for about 6 minutes prior to release. About 0.1 quart of the Varsol solvent was removed from the double filter cake during this step.

The pressed material, now in a generally sheet-like shape, was heated to about 110° F. and passed through calendering rolls maintained at a temperature of 90±5° F. The roll speed was maintained at 3 feet per minute and the initial gap between the facing rolls was 0.415 inch. After the initial pass through the rolls, the sheet was folded one time along its longitudinal axis and then again passed through the rolls in a direction generally 90° to the initial rolling direction. The folding, rotation and rolling were carried out a third and fourth time using the 0.415 gap. Thereafter, rolling with the folding and rotation were carried out 4 times at 0.250 inch and 5 times each at a 0.125 and 0.080 inch roll gap.

The calendered PTFE sheet was then sintered at about 360° C. for about 1.5 hours. The PTFE sheet was heated to the sintering temperature at a rate of about 100° C. per hour.

Following sintering, the sodium chloride was leached from the PTFE sheet using water containing 0.1 percent by weight DuPont Zonyl FSN surfactant. After leaching, the now porous PTFE sheet was air dried at room temperature to avoid decomposition of the surfactant remaining on the sheet. PTFE sheet containing the optional wettable filler material may, if desired, be dried at an elevated temperature.

The so-produced 0.070 inch thick PTFE was 72 percent porous with an average pore size of 6 microns, liquid permeability factor of 3 and a gas permeability of 12 seconds. The longitudinal tensile strength was 300 psi. The so-produced material performed satisfactorily as a diaphragm in an electrolytic cell for producing gaseous chlorine and an aqueous sodium hydroxide solution from an aqueous sodium chloride containing brine.

What is claimed is:

1. A method to form an electrolyte permeable diaphragm for an electrolytic cell for producing chlorine and an alkali metal hydroxide comprising:
   (a) combining about 1 to about 50 parts by weight polytetrafluoroethylene powder having an average particle size of about 100 to about 1,000 microns diameter with about 50 to about 98 parts by weight of a solid pore-forming powder having an average particle size of about 0.1 to about 100 microns diameter, and about 10 to about 1,000 parts by weight of a nonaqueous liquid capable of wetting the polytetrafluoroethylene and incapable of dissolving substantial amounts of the pore-forming powder;

(b) mixing the combination with a shearing means sufficiently to reduce the average particle sizes of the polytetrafluoroethylene to leas than about 50 microns diameter;

(c) removing a portion of the liquid from the mixture of step (b) until the mixture has a liquid to solid weight ratio of about 0.05 to about 1;

(d) rolling the compressed mixture a plurality of times to form a sheet;

(e) heating the sheet sufficiently to sinter the sheet material; and (f) removing at least a portion of the solid pore-forming powder from the sintered sheet by contacting the sheet with a liquid medium to produce a porous polytetrafluoroethylene sheet with a thickness of from about 5 to about 100 mils, an average pore size of from about 0.1 to about 100 microns, a gas permeability of from about 1 to about 100 seconds, a liquid permeability factor of from about 1 to about 60, and a tensile strength of from about 100 to about 1000 pounds per square inch.

2. The method of claim 1 wherein steps (a) and (b) are performed substantially simultaneously.

3. The method of claim 1 wherein the polytetrafluoroethylene powder and the pore-forming powder are combined in a weight ratio of about 1:2 to about 1:9.

4. The method of claims 1 or 3 wherein a water wettable filter powder with an average particle size of less than about 100 microns is combined in step (a) in an amount of about 5 to about 500 weight percent of the polytetrafluoroethylene.

5. The method of claim 4 wherein the filler powder is at least one material selected from the group consisting of carbon, silicon dioxide and titanium dioxide.

6. The method of claim 4 wherein dry water wettable filler and pore-forming powder are mixed together before combining with the nonaqueous liquid in step (a).

7. The method of claim 1 wherein the liquid in step (b) is an aliphatic hydrocarbon.

8. The method of claim 1 wherein the liquid is present in an amount of about 100 to about 400 parts by weight.

9. The method of claim 1 including the additional step of drying the sheet of step (f) at a temperature of up to about 85° C.

10. The method of claim 1 wherein the sheet of step (f) is about 40 to about 80 mils thick.

11. The method of claim 1 wherein the sheet of step (f) is from about 60 to about 90 percent porous.

12. The method of claim 1 wherein the liquid permeability factor of the sheet of step (f) is about 5 to about 25.

13. The method of claim 1 wherein the thickness of the sheet of step (f) is about 40 to about 80 mils, the average pore size dimension is about 1 to about 20 microns, the gas permeability is from about 60 to about 90 seconds, the liquid permeability factor is from about 5 to about 25, the tensile strength is about 150 to about 700, said diaphragm is about 70 to about 80 percent porous, and about 85 to about 95 percent of the pores are of a size within two orders of magnitude from each other.

14. The method of claim 13 wherein the tensile strength of the sheet is about 250 to about 600 pounds per square inch.

15. The method of claim 1 including the additional step of compressing the mixture of step (c) at a pressure of about 10 to about 100 pounds per square inch gauge before rolling.

* * * * *

UNITED STATES PATENT AND TRADEMARK OFFICE
CERTIFICATE OF CORRECTION

PATENT NO. : 4,380,521

DATED : April 19, 1983

INVENTOR(S) : Carlos M. Moreno et al.

It is certified that error appears in the above—identified patent and that said Letters Patent is hereby corrected as shown below:

In the Abstract, last line, insert the word --metal-- after "alkali".

Col. 6, line 10, delete "o" after the word "blending" and insert --to--.

Col. 7, Claim 1, line 7, delete the word "leas" and insert --less--.

Col. 7, Claim 4, line 34, delete the word "filter" and insert --filler--.

Signed and Sealed this

Ninth Day of August 1983

[SEAL]

Attest:

Attesting Officer

GERALD J. MOSSINGHOFF

Commissioner of Patents and Trademarks